UNITED STATES PATENT OFFICE.

HERMANN BOEDEKER, OF HÖCHST-ON-THE-MAIN, GERMANY, ASSIGNOR TO THE FARBWERKE, VORMALS MEISTER, LUCIUS & BRÜNING, OF SAME PLACE.

VIOLET DYE.

SPECIFICATION forming part of Letters Patent No. 438,053, dated October 7, 1890.

Application filed October 30, 1889. Serial No. 328,680. (Specimens.)

*To all whom it may concern:*

Be it known that I, HERMANN BOEDEKER, doctor of philosophy, a citizen of the Empire of Germany, residing at Höchst-on-the-Main, in the Empire of Germany, have invented certain new and useful Improvements in Coloring-Matter; and I do hereby declare the following to be a full, clear, and exact description of the invention, such as will enable others skilled in the art to which it appertains to make and use the same.

My invention relates to the manufacture of coloring-matter by the action of sulphuric acid upon ortho or para ditolylmeta-amido-phenolphthaleïne,

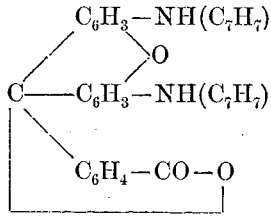

hereinafter called "ortho or para ditolylrhodamine," obtained by treating fluoresceïne-chloride with ortho or para toluidine. It will be found most suitable to use sulphuric-acid monohydrate or diluted fuming sulphuric acid.

Example: Ten parts, by weight, of ortho or para ditolylrhodamine are while being agitated and cooled introduced by degrees into sixty to eighty parts, by weight, of sulphuric-acid monohydrate. When a sample gives a clear solution with soda, the sulphonic acid is precipitated by pouring it into water, from which it is filtered off, washed with water, and transformed into its sodium salt by boiling with a soda solution. The sodium salt thus formed is precipitated by means of common salt, pressed off, and dried. The sulphonic acid of ortho or para ditolylrhodamine thus obtained dissolves easily in alcohol, but is of difficult solubility in hot water, the para derivative more so than the ortho derivative. In cold water it is nearly insoluble. With alkalies it forms a salt soluble in water.

The coloring-matter from the ortho derivative dyes silk and wool red-violet tints, and that from the para derivative deep-blue-violet tints. These tints excel by their resistance to the influence of air and light and against soaping.

What I claim as my invention, and desire to secure by Letters Patent, is—

The coloring-matter described, obtained by the action of sulphuric acid upon ortho or para ditolylrhodamine, produced by the action of fluoresceïne-chloride upon ortho or para toluidine, and having the characteristic properties that in form of its free acid it dissolves easily in hot alcohol, with difficulty in hot water, and with great difficulty in cold water. With alkalies it forms salts soluble in water, and it dyes silk and wool violet tints.

In testimony whereof I affix my signature in presence of two witnesses.

HERMANN BOEDEKER.

Witnesses:
JOSEPH REVERDY,
HEINRICH HAHN.